(12) United States Patent
Viswanathan

(10) Patent No.: US 7,377,108 B2
(45) Date of Patent: May 27, 2008

(54) APPARATUS AND METHOD FOR REDUCTION JET NOISE FROM SINGLE JETS

(75) Inventor: Krishnamurthy Viswanathan, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 674 days.

(21) Appl. No.: 10/822,348

(22) Filed: Apr. 9, 2004

(65) Prior Publication Data

US 2005/0223691 A1    Oct. 13, 2005

(51) Int. Cl.
*F02K 1/00* (2006.01)

(52) U.S. Cl. ........................................ 60/770; 60/226.1

(58) Field of Classification Search ............... 60/226.1, 60/262, 263, 770
See application file for complete search history.

(56) References Cited

U.S. PATENT DOCUMENTS

| 3,215,172 | A | | 11/1965 | Ardoin | |
|---|---|---|---|---|---|
| 3,393,518 | A | * | 7/1968 | Bridge | 60/770 |
| 3,590,943 | A | | 7/1971 | Millman | |
| 3,625,432 | A | * | 12/1971 | Bragg | 239/265.35 |
| 3,648,800 | A | | 3/1972 | Hoerst | |
| 3,655,008 | A | | 4/1972 | Millman | |
| 3,844,375 | A | | 10/1974 | Manca et al. | |
| 4,214,703 | A | | 7/1980 | Sorensen et al. | |
| 4,288,984 | A | * | 9/1981 | Bhat et al. | 60/262 |
| 4,817,379 | A | * | 4/1989 | Bagley | 60/761 |
| 5,450,720 | A | | 9/1995 | Vuillamy et al. | |
| 5,692,372 | A | * | 12/1997 | Whurr | 60/226.1 |
| 5,924,632 | A | * | 7/1999 | Seiner et al. | 239/265.19 |
| 6,070,407 | A | * | 6/2000 | Newton | 60/226.1 |
| 6,082,635 | A | | 7/2000 | Seiner et al. | |
| 6,260,352 | B1 | * | 7/2001 | Negulescu et al. | 60/262 |
| 6,308,898 | B1 | * | 10/2001 | Dorris et al. | 239/265.17 |
| 6,314,721 | B1 | * | 11/2001 | Mathews et al. | 60/264 |
| 6,318,070 | B1 | * | 11/2001 | Rey et al. | 60/226.3 |
| 6,360,528 | B1 | | 3/2002 | Brausch et al. | |
| 6,415,598 | B2 | * | 7/2002 | Pinker | 60/226.1 |
| 6,532,729 | B2 | | 3/2003 | Martens | |
| 6,612,106 | B2 | | 9/2003 | Balzerr | |

(Continued)

FOREIGN PATENT DOCUMENTS

EP    1 104 847    6/2001

OTHER PUBLICATIONS

Viswanathan, K., "Analysis of the Two Similarity Components of Turbulent Mixing Noise", AIAA Journal, vol. 40, No. 9, Sep. 2002, pp. 1735-1744.

(Continued)

*Primary Examiner*—William H. Rodriguez
(74) *Attorney, Agent, or Firm*—Harness, Dickey & Pierce, P.L.C.

(57) ABSTRACT

An exhaust flow nozzle for use with a jet engine. The exhaust flow nozzle includes a beveled downstream edge portion that helps to direct noise generated by the jet engine upwardly away from a ground surface during takeoff and landing operations. One preferred embodiment makes use of a linearly moveable flow altering component that is positioned outside the final flow nozzle. When the flow altering component is in its retracted position it has no effect on the exhaust flow leaving the flow nozzle. Alternative embodiments involve the use of varying edge shapes for the final flow nozzle.

6 Claims, 10 Drawing Sheets

U.S. PATENT DOCUMENTS

| | | | |
|---|---|---|---|
| 6,640,537 B2 | 11/2003 | Tse | |
| 6,658,839 B2 | 12/2003 | Hebert | |
| 6,969,028 B2 * | 11/2005 | Dun | 244/54 |
| 7,000,378 B2 * | 2/2006 | Birch et al. | 60/226.1 |
| 7,174,718 B2 * | 2/2007 | Bonnet et al. | 60/770 |
| 2002/0073691 A1 * | 6/2002 | Rey et al. | 60/226.1 |
| 2002/0121090 A1 * | 9/2002 | Zysman et al. | 60/770 |
| 2002/0125340 A1 * | 9/2002 | Birch et al. | 239/265.11 |
| 2005/0060982 A1 * | 3/2005 | Mani et al. | 60/226.1 |
| 2005/0223691 A1 * | 10/2005 | Viswanathan | 60/204 |

OTHER PUBLICATIONS

Viswanathan, K., "Parametric Study of Noise From Dual-Stream Nozzles", AIAA 2003-1198, Jan. 2003, pp. 1-11.

Viswanathan, K., "Aeroacoustics of Hot Jets", AIAA 2002-2481, Jun. 2002, pp. 1-11.

Viswanathan, K., "Jet Aeroacoustic Testing: Issues and Implications", AIAA Journal, vol. 41, No. 9, Sep. 2003, pp. 1674-1689.

Viswanathan, K. and Clark, L.T., "Effect of Nozzle Internal Contour on Jet Aeroacoustics", AIAA 2004-8, Jan. 2004, pp. 1-11.

* cited by examiner

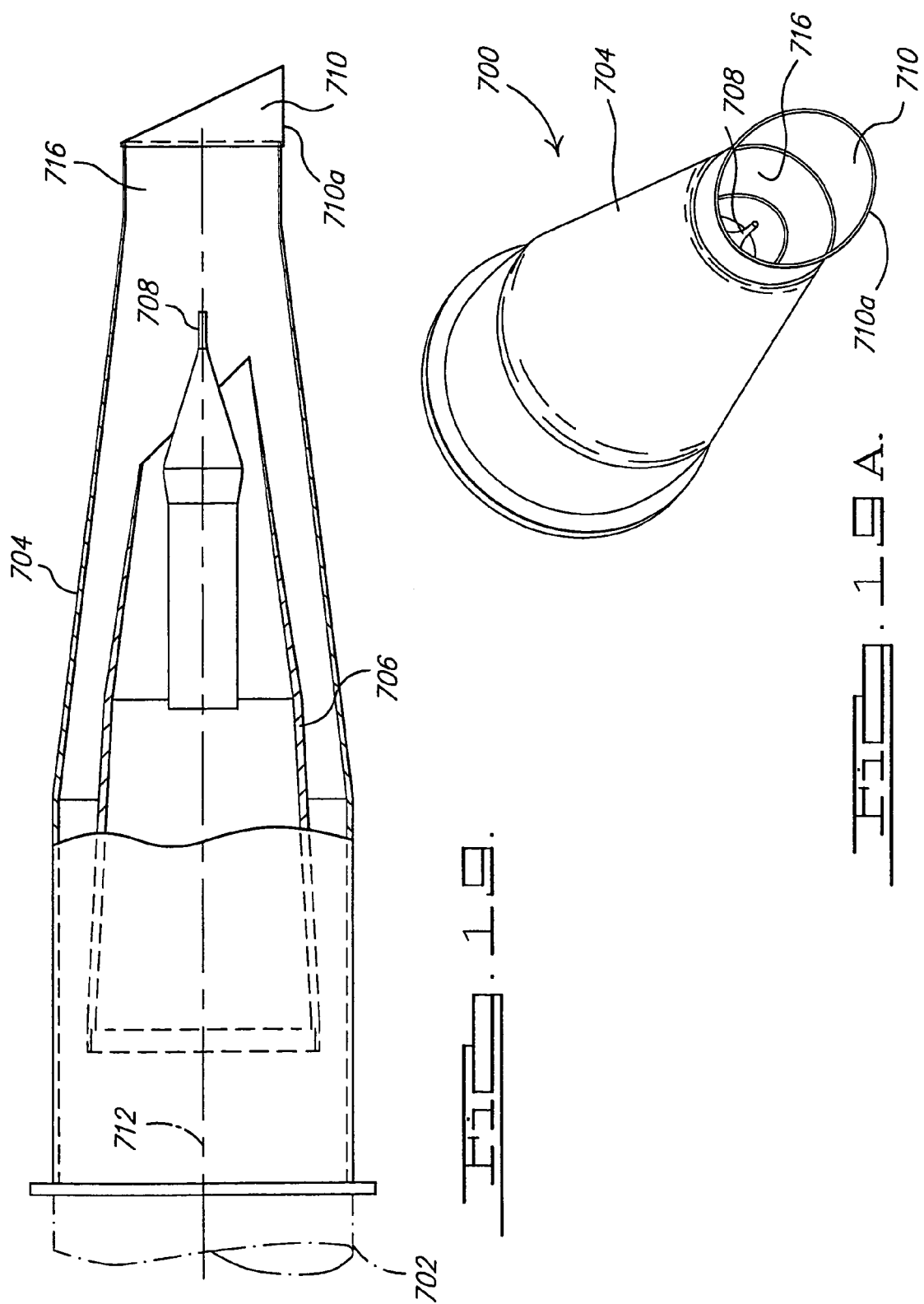

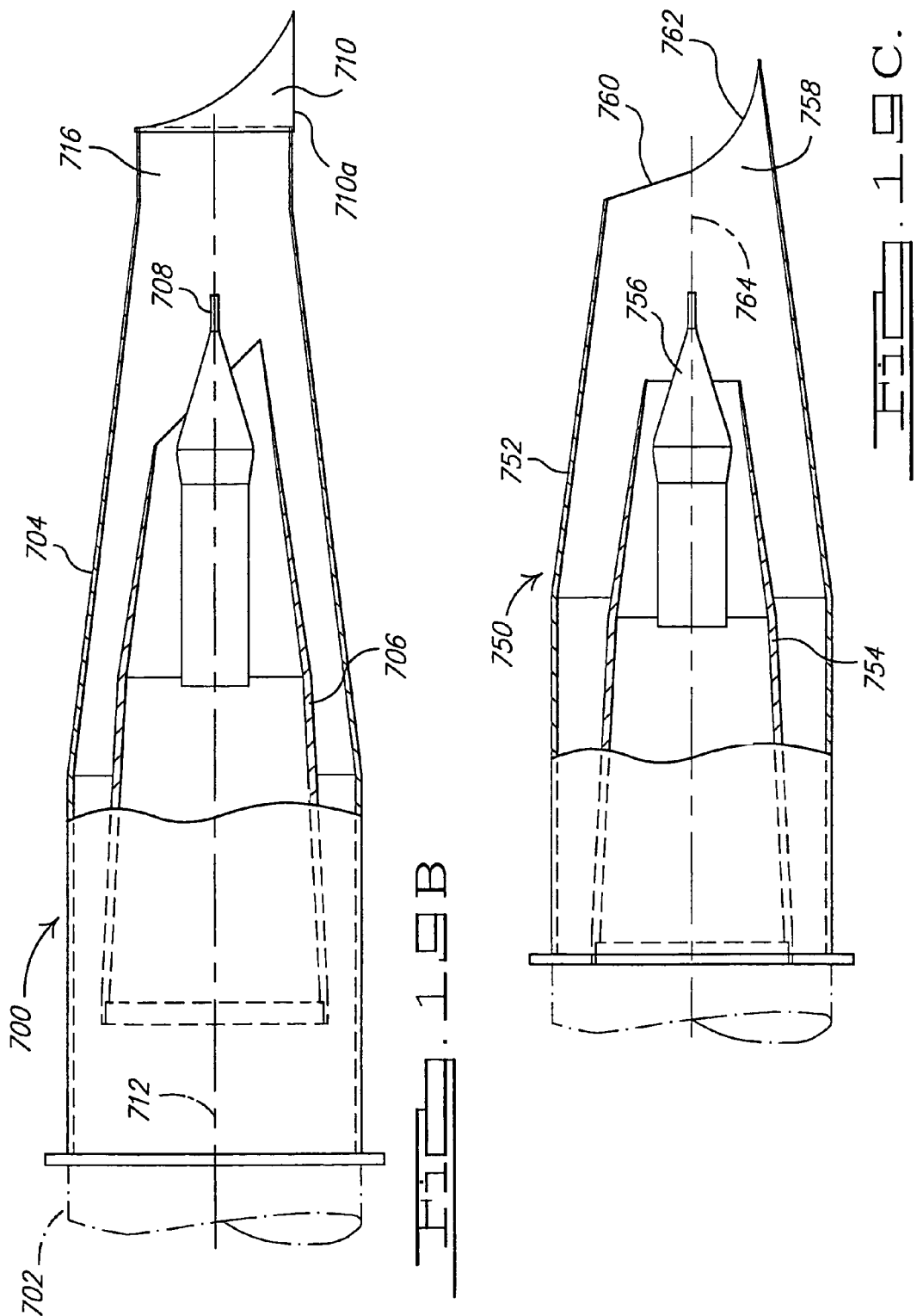

APPARATUS AND METHOD FOR REDUCTION JET NOISE FROM SINGLE JETS

FIELD OF THE INVENTION

This invention relates to exhaust flow nozzles for jet engines and more particularly to an exhaust flow nozzle for a single flow or mixed flow jet engine that reduces noise generated by the jet engine.

BACKGROUND OF THE INVENTION

Aircraft noise from commercial and private jet aircraft is an undesirable byproduct of modern aviation. The growth of air travel and the number of jet aircraft operating at present day airports throughout the world has led to an ever increasing level of jet aircraft noise. Additionally, as residential dwellings have been constructed closer and closer to commercial airports, more and more individuals have been exposed to noise from the operation of commercial and private jet aircraft. It will be appreciated that jet aircraft noise is particularly acute during takeoff and landing procedures. During takeoff, the engines on commercial jet aircraft are often operated at maximum thrust and therefore generate very significant sound pressure levels.

To reduce jet noise at commercial airports, various noise abatement procedures and regulations have been implemented in many cities and communities around the world. These abatement procedures often involve monitoring the noise level generated by departing and incoming jet aircraft at various times of the day, the use of nighttime curfews, the use of preferred runways, the use of noise-based landing fees, fines for exceeding predetermined noise levels, limitations on early morning departure times, and various other restrictions. The number of airports that have implemented some form of noise-related operational restriction has grown dramatically in recent years and is expected to continue to rise.

Aircraft noise is also an important consideration from the perspective of passengers and crew members on board an aircraft while the aircraft is traveling at cruise conditions. Aircraft with quieter interiors are preferred by crew, passengers and airlines. Low cabin noise can be an important marketing factor for airlines.

Thus, there is a continuing need to reduce the noise produced by jet engines used on jet aircraft, both commercial and private, so that cabin noise, as well as community noise experienced around an airport, can be reduced.

SUMMARY OF THE INVENTION

The present invention is directed to an exhaust flow nozzle that reduces the sound pressure level of noise generated by the jet engine, and particularly at areas below the jet engine. The present invention is particularly effective for reducing noise levels produced by a jet engine, as perceived by individuals at ground level, during takeoff and landing operations.

In one preferred form the present invention comprises a tubular flow nozzle having a downstream edge through which an exhaust plume generated by a jet engine exits. The downstream edge forms a beveled surface with the degree of the bevel ranging preferably from about 5°-45° from a plane extending orthogonally to a longitudinal axis of the tubular flow nozzle.

In an alternative embodiment a first portion of the downstream edge of the tubular flow nozzle extends orthogonal to the longitudinal axis, while a second portion adjacent the first portion is beveled such that it extends non-parallel to the first portion. The resulting downstream edge forms a non-linear plane, with either one or both portions forming a beveled surface. In still another alternative preferred embodiment the downstream edge includes a curving portion that effectively forms an extension or lip portion at a bottom dead center area of the tubular flow nozzle. In still another alternative embodiment, the downstream edge includes a combination of a straight beveled portion and a curving portion. In one preferred form, the longer lip of the beveled nozzle would be oriented at a suitable angle between the bottom dead center and top dead center.

The above-described alternative preferred forms of the downstream edge of the exhaust flow nozzle are incorporated in a single flow nozzle as well as a mixed flow exhaust flow nozzle used with a turbofan jet engine. In the various preferred embodiments the mixed flow exhaust flow nozzle incorporates a primary or core nozzle disposed concentrically within a common (i.e., final) nozzle. The primary or core nozzle has a downstream edge arranged orthogonal to a longitudinal axis of the primary nozzle. In an alternative preferred embodiment, the downstream edge of the primary or core nozzle is beveled. The downstream edge could be a single beveled edge or consist of two beveled portions that are not parallel to each other. In an alternative preferred embodiment an exhaust flow nozzle for a mixed flow turbofan engine is disclosed in which a primary nozzle includes a mixer nozzle downstream edge for facilitating mixture of primary and bypass flow streams prior to the flow streams exiting a downstream edge of the common final nozzle structure, wherein the common final nozzle structure is beveled.

In still further alternative preferred forms, the present invention is directed to an exhaust flow nozzle having a nozzle member which supports a movable nozzle extension. The nozzle extension can be retracted relative to the nozzle member, and can also be extended relative to the nozzle member to extend outwardly of the downstream edge of the nozzle member. The nozzle extension forms a lip for modifying the jet plume emitted from the downstream edge of the nozzle member. In one preferred form the nozzle extension is oriented at a bottom dead center position of the nozzle member.

The various preferred embodiments all modify the jet plume, and the resulting noise, emitted from the exhaust flow nozzle associated with a jet engine such that sound pressure levels at an area below the exhaust nozzle are reduced.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 19 is a side view of the nozzle in FIG. 18 in which the nozzle extension member has been extended to form a beveled edge surface; and FIG. 19a shows a perspective view of the nozzle shown in FIG. 19;

FIG. 19b is a side view of another alternative embodiment wherein the trailing edge of the retractable extension has a curved portion.

FIG. 19c is a side view of another alternative preferred embodiment of a mixed flow exhaust nozzle where the downstream edge of a common nozzle includes both a beveled and a curved edge portion.

DETAILED DESCRIPTION OF THE PREFERRED EMBODIMENTS

The following description of the preferred embodiment(s) is merely exemplary in nature and is in no way intended to limit the invention, its application, or uses.

Figure 1:
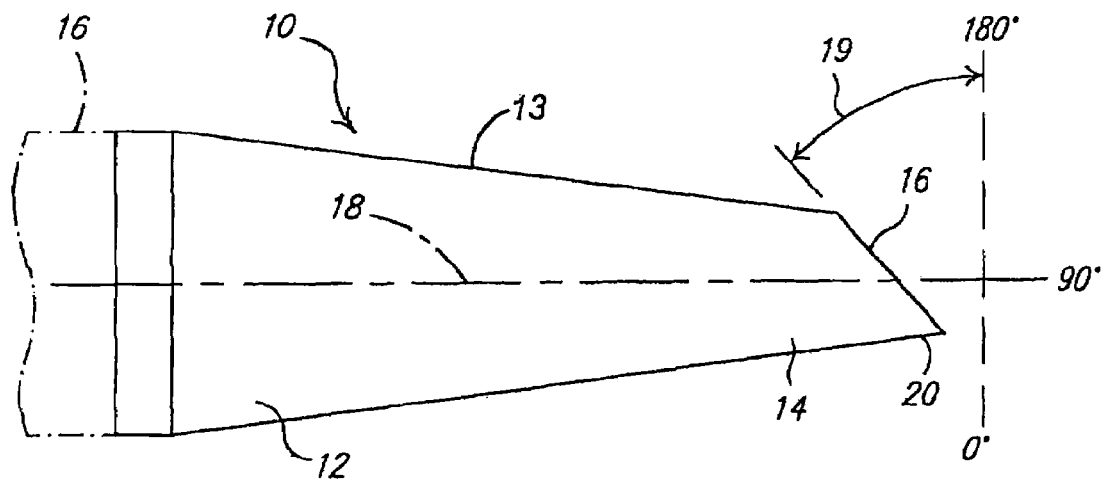
FIG. 1 is a side cross-sectional view of a single exhaust nozzle having a beveled downstream edge portion, in accordance with a preferred embodiment of the present invention.
Figure 1A:
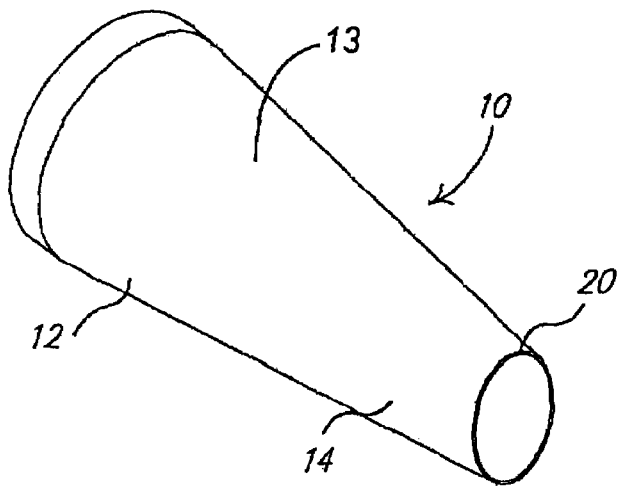
FIG. 1a is a perspective view of the exhaust nozzle of FIG. 1.

Referring to FIG. 1, an exhaust flow nozzle 10 is shown in accordance with a preferred embodiment of the present invention. The exhaust flow nozzle forms a tubular component having a continuous, linear tapering outer wall 13 over its entire length, an upstream end 12 and a downstream end 14. A jet engine 16 generates exhaust gases which are directed into the nozzle 10 and which exit though the downstream end 14. Downstream end 14 indudes a beveled edge 16. Beveled edge 16 is beveled at an angle 19 of preferably of about 5°-50°, although it will be appreciated that this angle could vary from this range to meet the needs of a specific aircraft application. The above-mentioned angle is measured relative to a plane orthogonal to the longitudinal center line 18 extending longitudinally though the nozzle 10. In effect, the downstream end 14 forms a "lip" or extension 20 which helps to alter the flow of exhaust gasses exiting from the nozzle 10 in a manner that reduces sound pressure levels at an area below the nozzle 10 when the nozzle is affixed to an aircraft.

Figure 2:
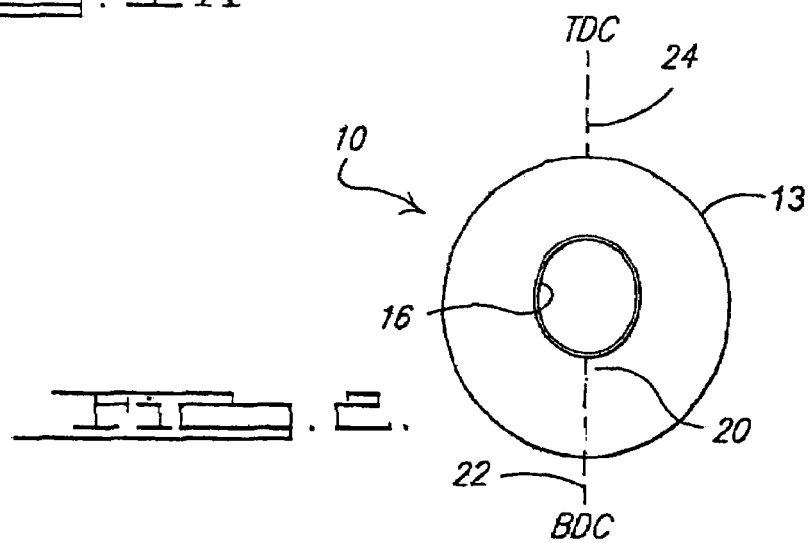
FIG. 2 is an end view of the exhaust nozzle of FIG. 1.

With brief reference to FIG. 2, the lip or extension 20 is arranged at a bottom dead center (BDC) position 22 of the nozzle 10 when the nozzle 10 is secured to supporting structure associated with an aircraft. It will be appreciated that the bottom dead center position 22 faces a ground surface when the nozzle is secured to an aircraft and the aircraft is stationed at an airfield or performing takeoff or landing maneuvers. It will further be understood that a top dead center (TDC) position 24 would be located opposite on the nozzle 10 to the bottom dead center position 22.

With reference to FIGS. 1, 3, and 4-7, the sound pressure level (SPL) is measured in decibels (dBs) and can be seen in various areas around an aircraft 26. With specific reference to FIG. 1, azimuth angles 0°, 90° and 180° are shown relative to the nozzle 10. Zero degrees corresponds to the bottom dead center position 22 (FIG. 2), 90° corresponds to the plane of the longitudinal axis 18, and 180° corresponds to the top dead center position 24 (FIG. 2).

Figure 3:
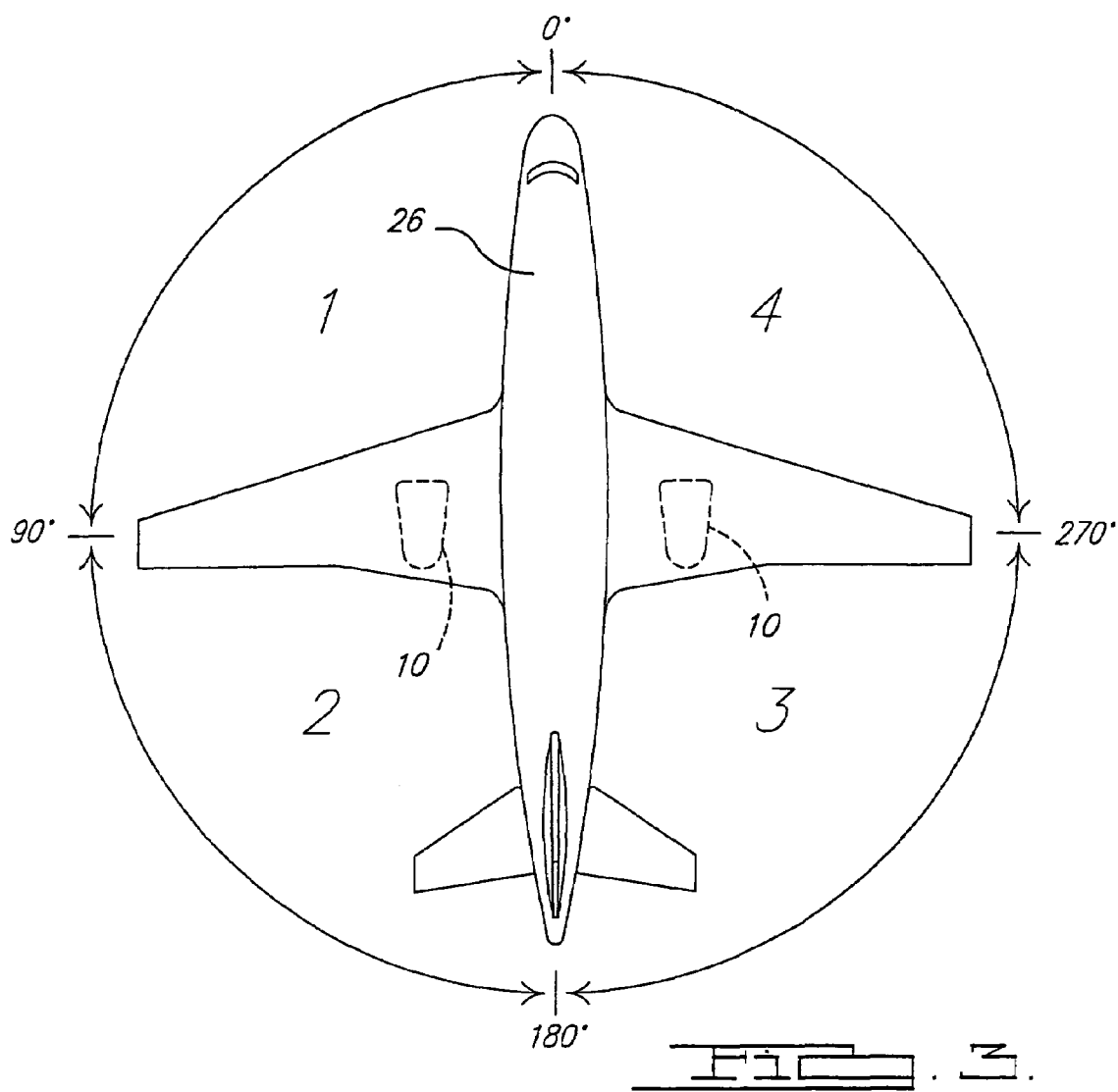
FIG. 3 is a plan view of an aircraft incorporating the exhaust flow nozzle of the present invention, and illustrating the 4 polar quadrants in relation to the aircraft for interpreting the graphs of FIGS. 4-11.
Figure 4:
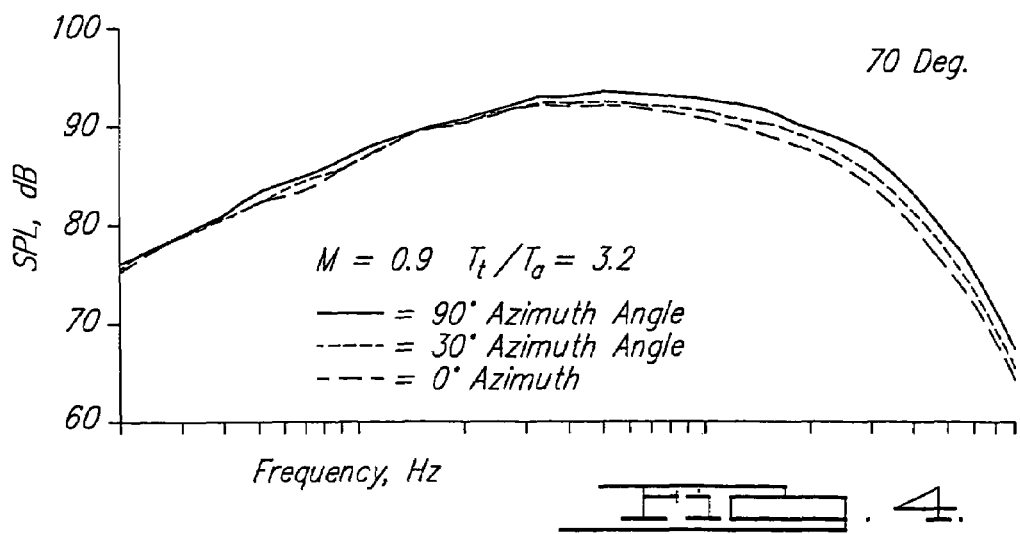
FIG. 4 is a graph of the sound pressure levels recorded at different azimuthal angles in the first polar quadrant of FIG. 3.
Figure 5:
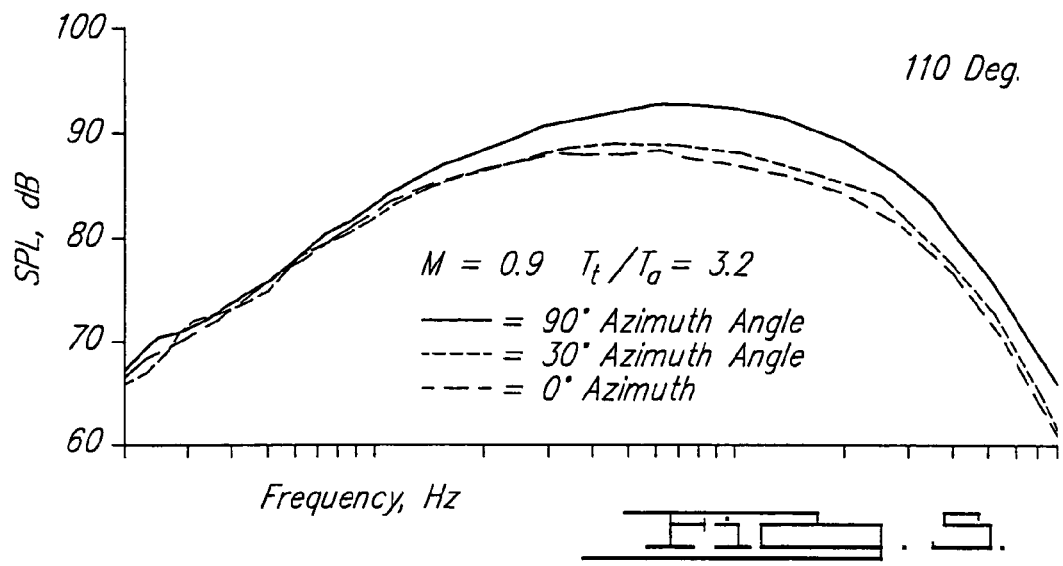
FIG. 5 is a graph of the sound pressure levels recorded at various azimuthal angles in the second polar quadrant of FIG. 3.
Figure 6:
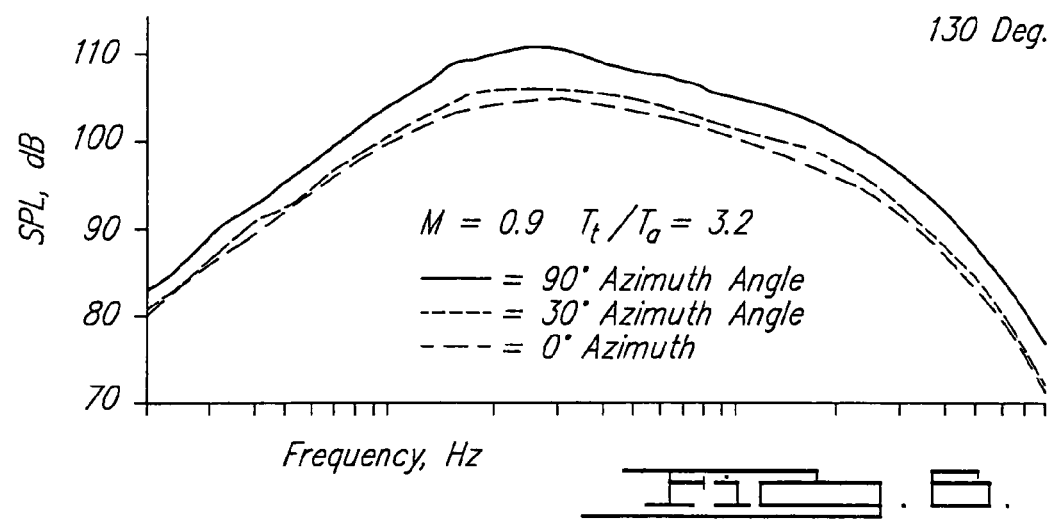
FIG. 6 is a graph of the sound pressure levels recorded at various azimuthal angles in the second polar quadrant of FIG. 3.
Figure 7:
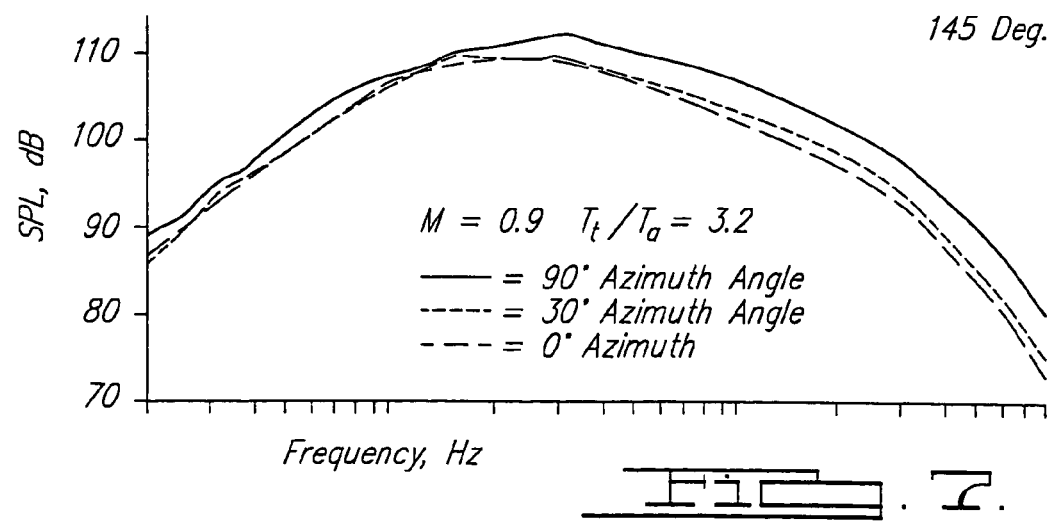
FIG. 7 is a graph of various sound pressure levels recorded at various azimuthal angles in the second polar quadrant of FIG. 3.
Figure 8:
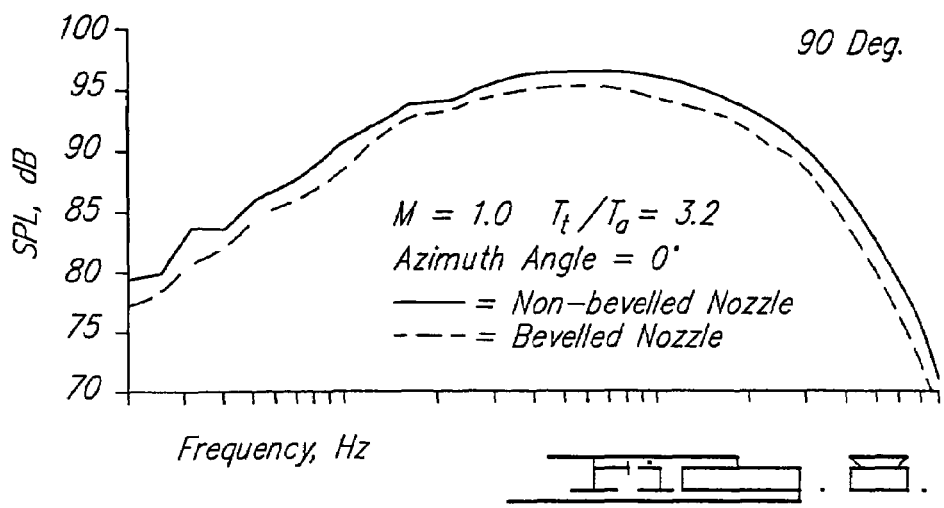
FIG. 8 is a graph of the sound pressure levels recorded at a polar angle of 90° for a conventional exhaust flow nozzle and for a nozzle in accordance with the present invention.
Figure 9:
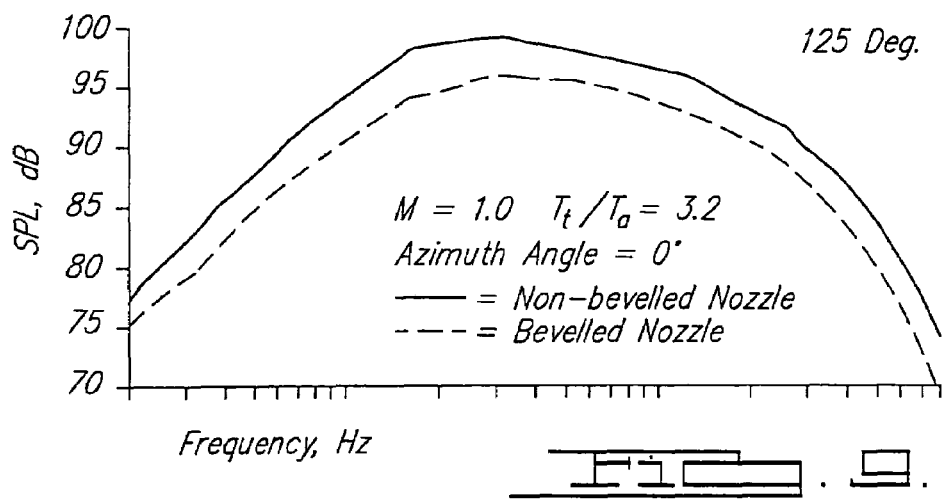
FIG. 9 is a graph of the sound pressure levels recorded at a polar angle of 125° for a conventional nozzle and for an exhaust flow nozzle in accordance with the present invention.
Figure 10:
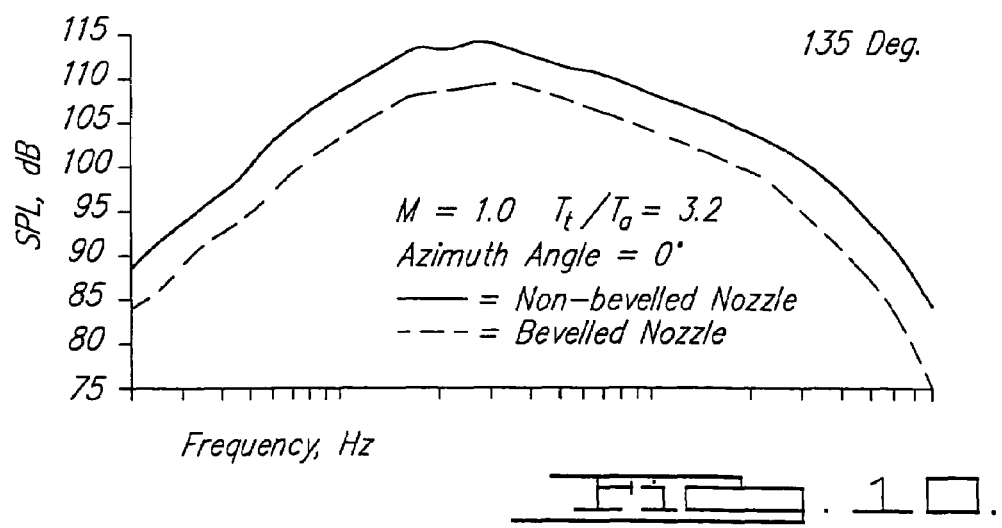
FIG. 10 is a graph of the sound pressure levels recorded at a polar angle of 135° for a conventional exhaust nozzle and a beveled exhaust nozzle in accordance with the present invention.
Figure 11:
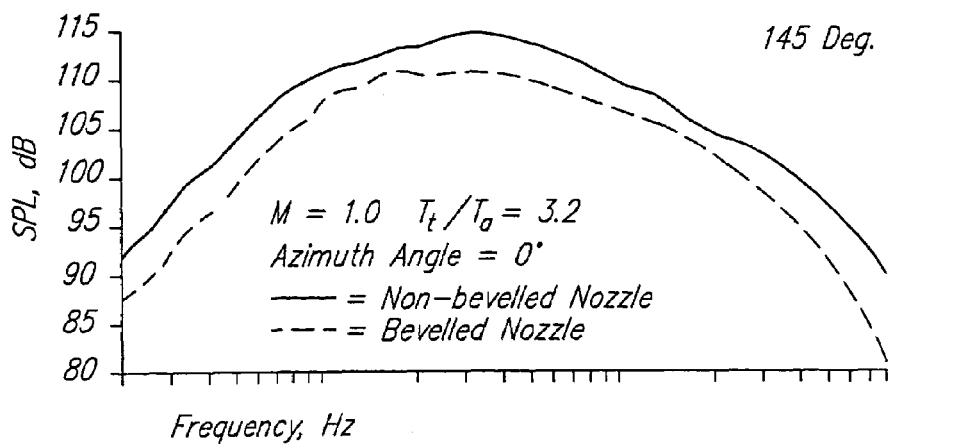
FIG. 11 is a graph of the sound pressure levels recorded at a polar angle of 145° for a conventional exhaust nozzle and a beveled nozzle in accordance with the present invention.

With specific reference to FIG. 3, the four polar quadrants used to interpret the graphs of FIGS. 4-7 are illustrated. Polar angles between 1°-90° correspond to the forward portion of an aircraft 26 on the port side (i.e., quadrant 1). Polar angles 91°-180° correspond to the quadrant at the aft portion of the aircraft 26 on the port side (quadrant 2). Polar angles 181°-270° correspond to quadrant 3 which is at the aft end of the aircraft on the starboard side. Polar angles 271°-360° correspond to quadrant 4 which is at the forward, starboard portion of the aircraft.

The graphs of FIGS. 4-7 illustrate the sound pressure level, in decibels, at various frequencies at three different azimuthal angles for polar angles 70°, 110°, 130° and 145°. For FIGS. 5, 6 and 7, it can be seen that the level of noise radiation at an azimuthal angle of 90° is significant over the sound pressure level produced at an azimuthal angle of 0°.

Referring to FIGS. 8-11, a direct comparison between a conventional exhaust nozzle having a non-beveled downstream edge, and the exhaust nozzle 10 of the present invention, can be seen for an azimuthal angle of 0°. It will be noted that there is a substantial reduction of about 5 db in sound pressure level across the spectrum at the aft angles (i.e., quadrant 2) where the jet noise peaks. Reductions of similar magnitudes have been noted at an azimuthal angle of 30° as well. It will be noted that there is noise reduction at all frequencies. Accordingly, the beveled nozzle 10 yields significant reduction in sound pressure levels for the jet noise generated under the flight path of an aircraft. In effect, the lip portion 20 of the beveled nozzle 10, with its bottom dead center position, effectively helps to radiate the noise emitted from the nozzle 10 up towards the sky. Essentially, because of significant radiation of acoustic energy at the top dead center position 24 (FIG. 2) of the nozzle 10, less acoustic energy becomes available for radiation in the aft direction of the aircraft (polar quadrants two and three), where peak noise radiation typically occurs for a conventional exhaust nozzle. This is why the nozzle 10 of the present invention achieves a noise level reduction across all frequency spectra. Furthermore, the noise reduction provided by the nozzle 10 is even greater at higher flow velocities, since the noise generated by large scale turbulent structures in the plume of a jet engine, is more pronounced at higher exhaust flow velocities. The present invention 10 thus modifies the radiation pattern of noise generated by a jet engine to more effectively direct the noise towards the top dead center position 24 of the nozzle 10.

Figure 12:
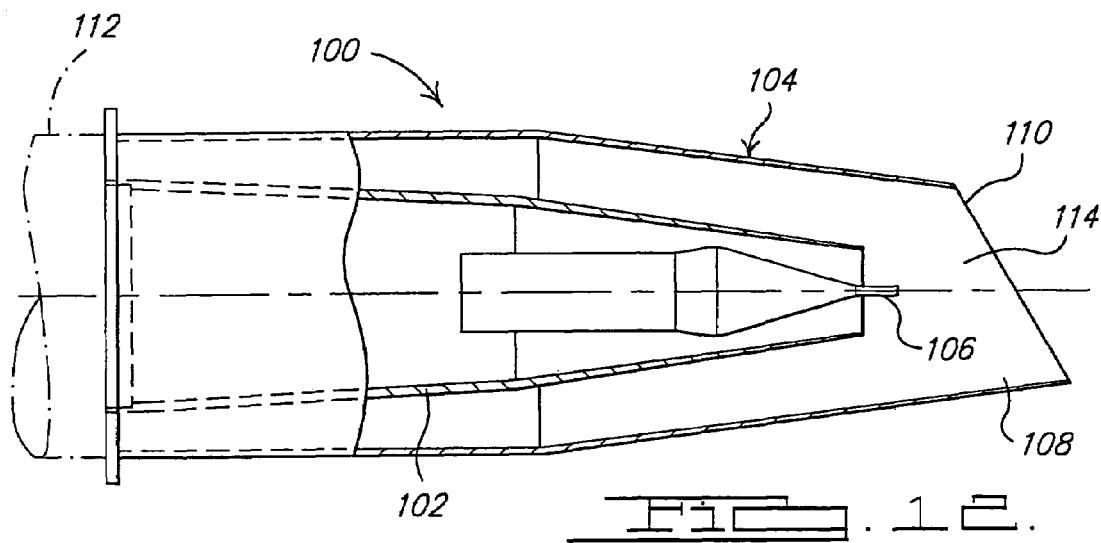
FIG. 12 is a side-cross sectional view of an exhaust nozzle for a mixed flow turbofan jet engine in which a downstream edge of the common nozzle includes a beveled surface.

Referring to FIG. 12, an exhaust nozzle 100 in accordance with an alternative preferred embodiment of the present invention is shown. Exhaust flow nozzle 100 is comprised of a primary or core nozzle 102 and a common or final nozzle 104. The primary nozzle 102 forms a well known "splitter" nozzle having a plug 106 projecting slightly outwardly therefrom. A downstream edge 108 of the final nozzle 104 includes a beveled edge 110. Beveled edge 110 is formed at an angle of preferably about 5°-50°, although it will be appreciated that this range can vary to suit the needs of a specific application. The exhaust flow nozzle 100 is adapted for use with a mixed flow turbofan engine 112. The exhaust flow nozzle 100 enables a degree of mixing of the exhaust and fan flows to be accomplished within an area 114 before the intermixed plume exits the final nozzle 104.

Figure 13:
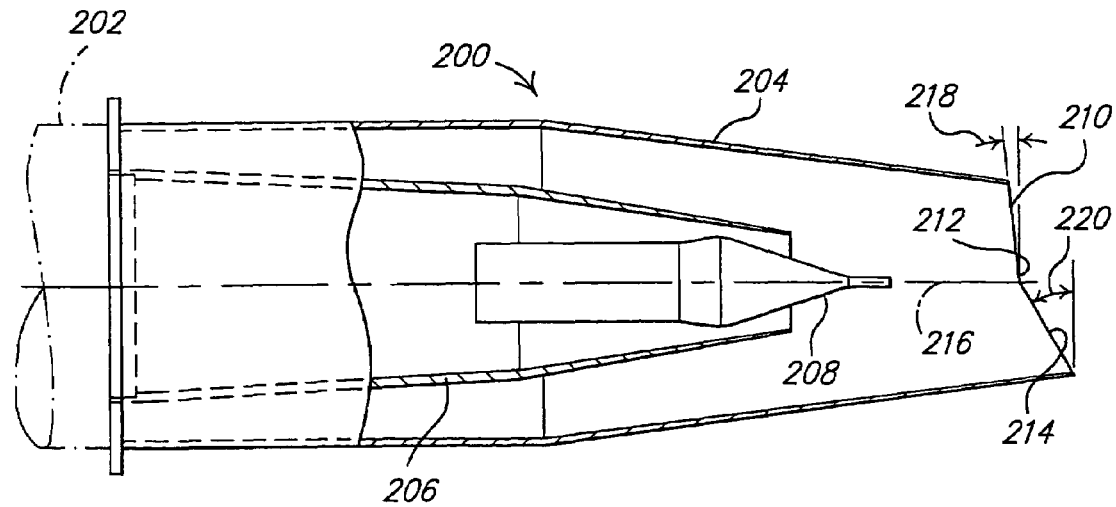
FIG. 13 is a side-cross sectional view of an alternative preferred embodiment of the present invention illustrating a mixed flow nozzle for a jet engine in which a downstream edge of the common nozzle includes a non-linear edge with two distinct beveled surfaces.

Referring to FIG. 13, an exhaust flow nozzle 200 in accordance with another preferred embodiment of the present invention is shown. Exhaust flow nozzle 200 is for use with a mixed flow turbofan engine 202. It is similar to nozzle 100 and also includes a final output nozzle 204 within which is concentrically disposed a primary nozzle 206 forming a simple splitter nozzle with a plug 208. The principal difference between nozzle 200 and nozzle 100 is that nozzle 200 includes a non-linear downstream edge 210. Edge 210 is comprised of a first edge 212 and a second edge 214 disposed adjacent one another. Edges 212 and 214 are disposed on opposite sides of a longitudinal center line 216 extending through the nozzle 200, although it will be appreciated that the precise demarcation between edge surfaces 212 and 214 could be formed so as to be above or below the longitudinal center line 216. The bevel of edge 212, as denoted by angle 218, is preferably within the range of about 0°-10° although it will be appreciated that this range can vary to suit the needs of a specific application. The degree of beveled edge 214, denoted by angle 220, is preferably between about 10°-50°. The beveled edge 214 is preferably located at a bottom dead center position of the nozzle 200, although it will be appreciated that this position can be varied to suit specific aircraft applications.

Figure 14:
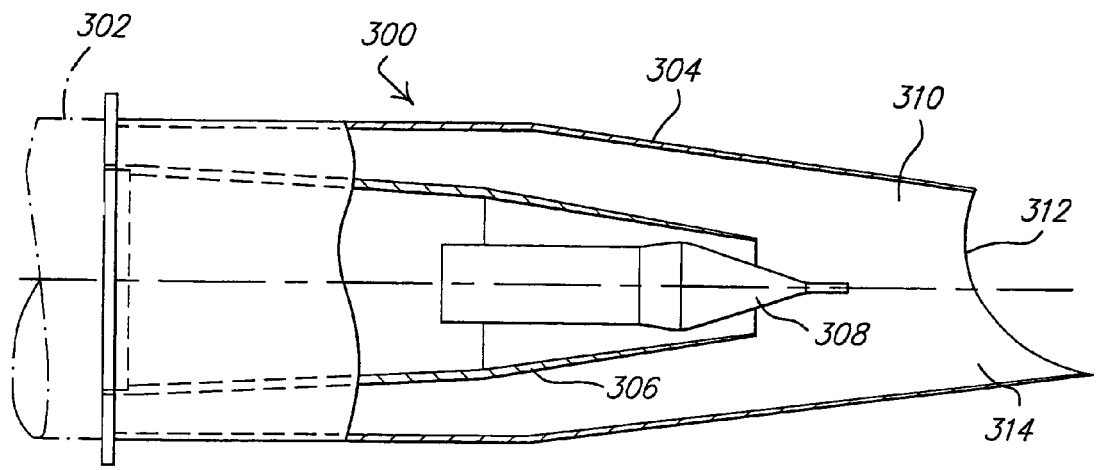
FIG. 14 is an illustration of a nozzle in accordance with another alternative preferred form of the present invention for use with a mixed flow jet engine in which a downstream edge of a common flow nozzle includes a curved outer edge surface.
Figure 14A:
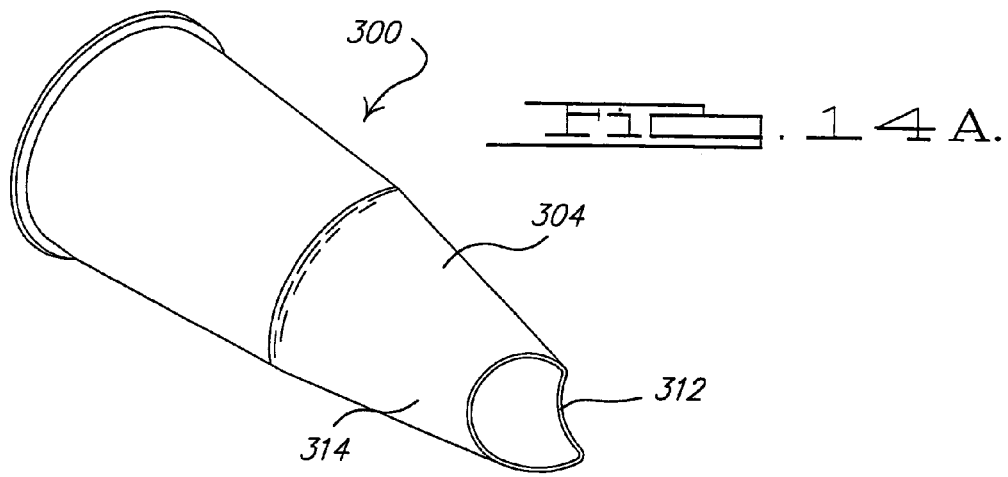
FIG. 14a is a rear perspective view of the nozzle of FIG. 14.

Referring to FIGS. 14 and 14a, still another exhaust flow nozzle 300 is illustrated in accordance with another alternative preferred embodiment of the present invention. Exhaust nozzle 300 is also for use with a mixed flow turbofan engine 302 and includes a final output nozzle 304 within which is concentrically disposed a primary nozzle 306. Primary nozzle 306 forms a conventional splitter nozzle having a plug 308. The principal difference between exhaust flow nozzle 300 and nozzle 200 is that nozzle 300 includes a downstream end 310 having a curved edge portion 312. The precise curvature of curved edge 312 may be varied as needed to suit specific aircraft applications. Curved edge portion 312 is also preferably orientated such that a lip portion 314 is orientated at a bottom dead center position of the nozzle 300, but lip portion 314 could also be oriented at a position intermediate the top dead center and bottom dead center positions.

Figure 15:
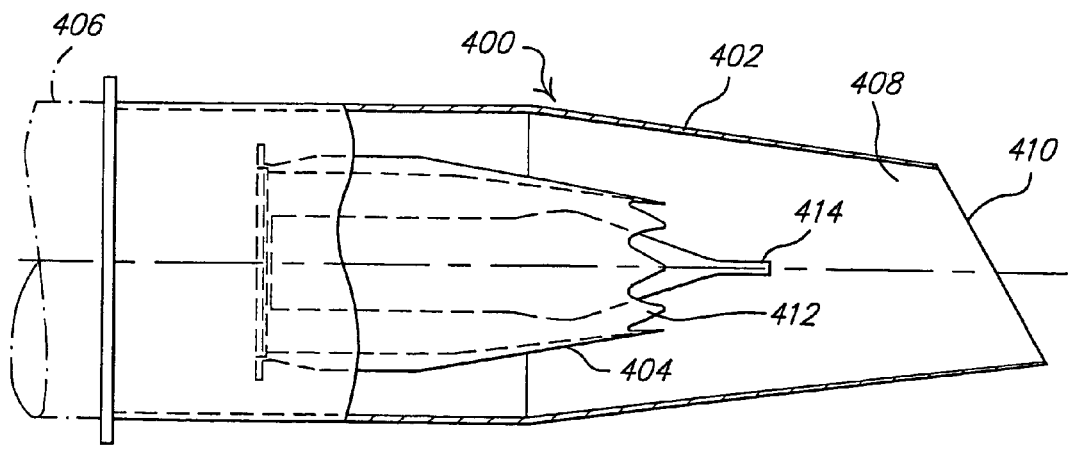
FIG. 15 illustrates a side-cross sectional view of a mixed flow nozzle system in which a primary nozzle forms a mixer nozzle, and a common nozzle includes a beveled edge surface.

FIG. 15 shows an exhaust flow nozzle 400 in accordance with yet another alternative embodiment of the present invention. Nozzle 400 includes a final output nozzle 402 and primary 404. Nozzle 400 is adapted for use with a mixed flow turbofan engine 406. The final nozzle 402 includes a downstream portion 408 having a beveled edge 410. The nozzle 400 is essentially identical to nozzle 100 with the exception that the primary nozzle 404 forms a mixer nozzle having chevrons or a lobed mixer 412 projecting therefrom for aiding in mixing exhaust and bypass flow streams. A plug 414 can be seen projecting from the primary nozzle 404. The angle of the beveled edge 410 is also preferably within about 10°-50°, although this can be varied significantly to suit specific aircraft applications.

Figure 16:
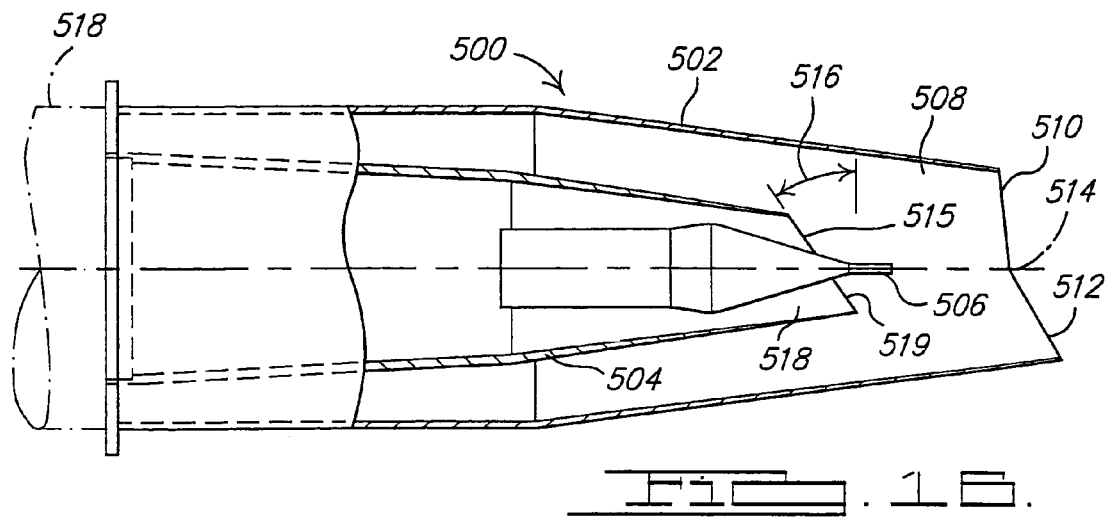
FIG. 16 illustrates another alternative preferred embodiment showing an exhaust nozzle for a mixed flow turbofan engine in which a primary nozzle includes a beveled downstream edge, and a common nozzle includes a beveled downstream edge with two distinct beveled surfaces.

Referring now to FIG. 16, an exhaust flow nozzle 500 in accordance with yet another alternative preferred embodiment of the present invention is shown. Nozzle 500 similarly includes a final flow nozzle 502 and a primary nozzle 504 disposed concentrically within the final flow nozzle 502. Primary nozzle 504 forms a conventional splitter nozzle having a plug 506 projecting outwardly therefrom. A downstream edge 508 of the final nozzle 502 also includes two beveled surfaces 510 and 512 disposed on opposite sides of a longitudinal centerline 514 extending through the final nozzle 502. The principal difference between nozzle 500 and nozzle 200 is the inclusion of a beveled edge 515 formed on the primary nozzle 504. This further serves to alter the exhaust flow stream by changing the mixing characteristics of the two streams inside 500. The angle 516 of the beveled edge 515 is also preferably between about 10°-50°, but could be varied considerably to suit the needs of a specific aircraft application. Nozzle 500 is particularly well adapted for use with a mixed flow turbofan engine 518. The beveled edge 515 also forms a lip portion 519 that is disposed at a bottom dead center position of the primary nozzle 504 or could be oriented at a suitable angle between the bottom dead center and top dead center.

Figure 17:
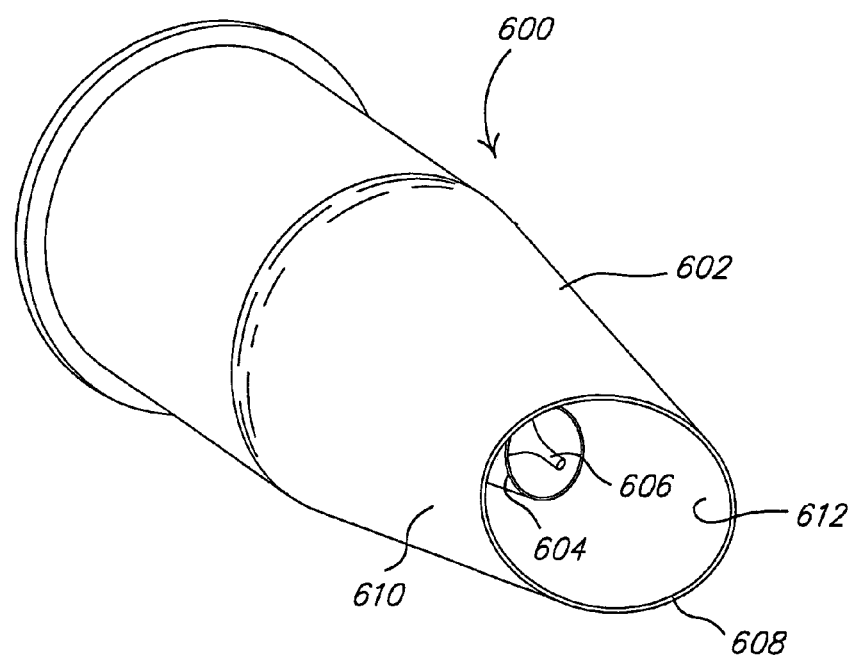
FIG. 17 illustrates a perspective view of an alternative preferred embodiment of the flow nozzle in which a common flow nozzle has an elongated lip portion forming a beveled outer edge surface that is positioned at approximately a three o'clock position.

Referring now to FIG. 17, an exhaust flow nozzle 600 is shown in accordance with yet another alternative preferred embodiment of the present invention. Exhaust flow nozzle 600 is intended for use with a mixed flow turbofan engine (not shown) and includes a final nozzle 602 and primary nozzle 604 disposed concentrically within the final nozzle 602. The primary nozzle 604 forms a simple splitter nozzle having a plug 606 projecting therefrom. The principal difference between nozzle 600 and nozzle 100 is that nozzle 600 includes a beveled edge surface 608 at a downstream end 610 which is canted to place a protruding lip portion 612 at an intermediate location in between top dead center and bottom dead center positions when the nozzle is being supported from an aircraft. In this specific example, lip portion 612 is orientated at a three o'clock position (from the port side of the aircraft) to provide a level of additional noise reduction inside a cabin area of an aircraft during cruise conditions. The jet engine on the starboard side would instead have nozzle 600 oriented with lip portion 612 at the nine o'clock position to also help direct jet noise from its associated engine away from the aircraft. Nozzle 600 is further adapted for use with a mixed flow turbofan engine, not shown.

Figures 18, 18A:
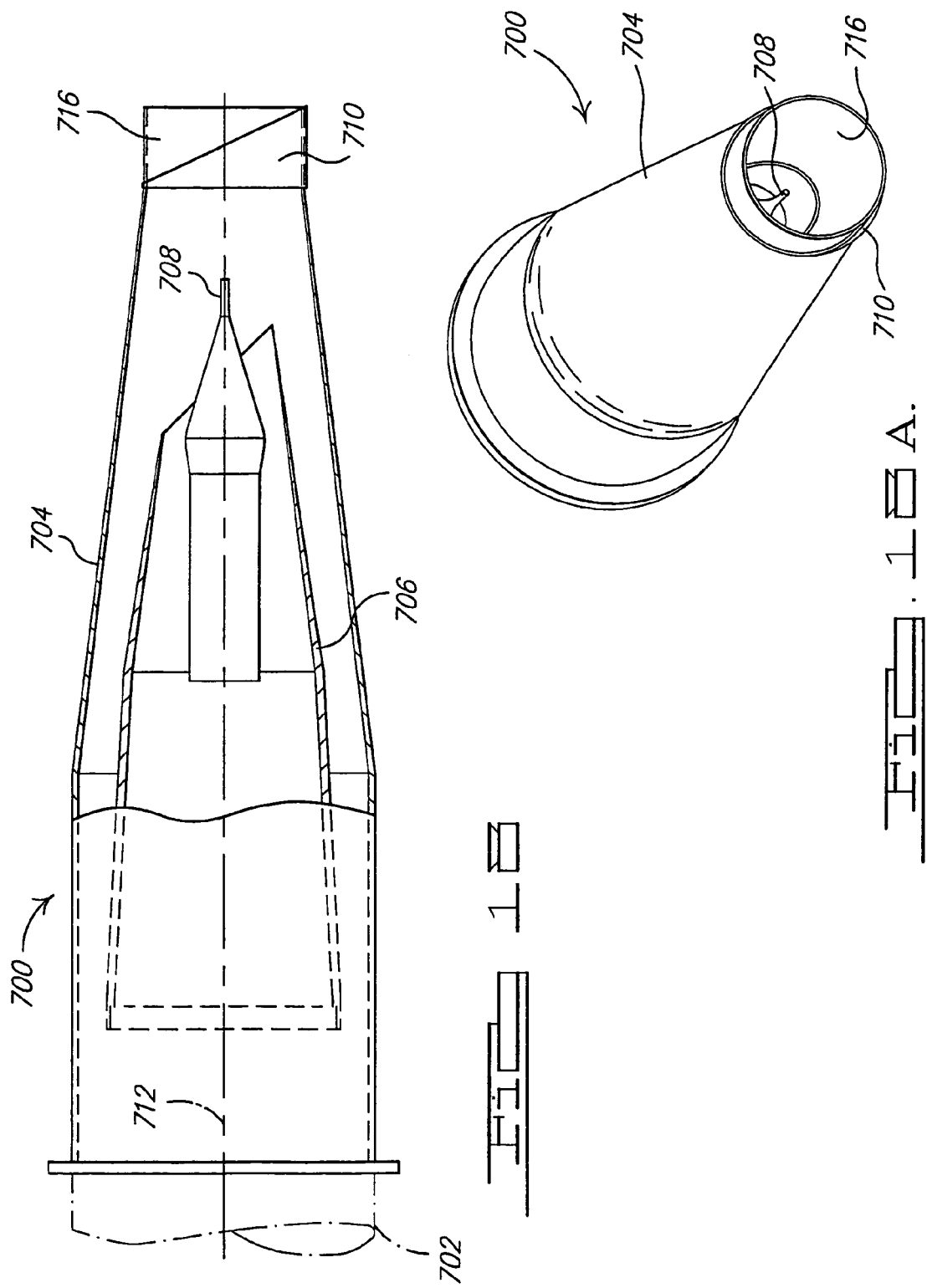
FIG. 18 is a simplified side-cross sectional view of another alternative preferred embodiment of the flow nozzle in which a linearly moveable nozzle extension member is housed outside a downstream portion of a common nozzle, and is shown in its retracted position.
FIG. 18a shows a perspective view of the nozzle shown in FIG. 18.

Referring to FIGS. 18 and 19, an exhaust flow nozzle 700 in accordance with still another alternative preferred embodiment of the present invention is shown. Exhaust flow nozzle 700 is adapted for use with a mixed flow turbofan engine 702 and includes a final nozzle 704 and a primary flow nozzle 706 disposed concentrically within the final nozzle 704. Primary flow nozzle 706 includes a plug 708 projecting therefrom and forms a simple splitter nozzle.

Primary nozzle 704 differs from previously described primary nozzles herein through the use of a linearly movable flow altering component 710 disposed concentrically outside a downstream portion 716 of the final nozzle 704 along the longitudinal axis 712 of the final nozzle 704. The flow altering component 710 basically forms a tubular component that is supported for movement along the downstream portion 716 of the final nozzle 704. Any suitable linkage/component can be used to linearly move the flow altering component 710 between its retracted position (FIGS. 18 and 18a) and its extended position (FIGS. 19 and 19a). In its retracted position it resides over an outside surface of the downstream portion 716. In its extended position it projects substantially beyond an edge of the downstream portion 716. A suitable implement may be incorporated for moving the flow altering component 710, such as stepper motor or any other suitable means able to impart linear movement to element 710. When in the retracted position of FIG. 18, the flow altering component 710 essentially has no impact on the jet plume exiting the final nozzle 704. However, when the flow altering component 710 is moved into its extended position as shown in FIG. 19, the lower most area 710a of the component 710 essentially forms a lip portion arranged at a bottom dead center of the final nozzle 704. The lip portion 710a essentially serves to modify the jet plume and direct the jet noise upwardly away from the ground surface. When the flow altering component 710 is in its retracted position of FIG. 18, it has essentially no effect on the exhaust flow leaving the final flow nozzle 704. Thus, the flow altering component 710 can be retracted during cruise conditions, and yet quickly deployed for landing and takeoff operations where noise reduction at areas below the aircraft is an important consideration.

FIG. 19b discloses an alternative form 710' of the retractable, extendable, flow altering component 710 which is curved.

Referring to FIG. 19c, still another alternative preferred embodiment is shown in the form of an exhaust nozzle 750 for a mixed flow turbofan engine. Nozzle 750 includes a final output nozzle 752 within which is disposed a primary nozzle 754 having a center plug 756. The final nozzle 752 has a downstream end 758 with a first beveled edge portion 760 and a second curving edge portion 762. Edge portions 760 and 762 are disposed on opposite side of longitudinal center line 764, but the precise point demarcating the two edge portions 760 and 762 could be varied slightly above or below center line 764 to suit specific aircraft applications.

It will be appreciated then that the various preferred embodiments described herein all enable a significant level of noise reduction to be achieved at areas below an aircraft during takeoff and landing procedures. At least one embodiment enables an additional degree of noise reduction to be achieved relative to the cabin area within an aircraft while the aircraft is traveling at cruise conditions. The various preferred embodiments do not add significantly to the structural complexity of present day exhaust flow nozzles used on modern commercial aircraft, and further do not require significant added expense or modification to the jet engines which these nozzles are typically used with.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A mixed flow exhaust nozzle for a jet engine, comprising:
    a tubular final nozzle having a continuous, linear tapering wall portion over its full length, and downstream linear edge portion through which exhaust flow from said jet engine exits said tubular final nozzle; and
    said downstream linear edge forming a beveled edge comprising an angle of greater than about 5 degrees relative to a reference plane bisecting said downstream edge portion, the reference plane extending orthogonal to a longitudinal axis of the tubular final nozzle, the beveled edge forming a linear edge extending from a top dead center to a bottom dead center of said downstream linear edge.

2. The exhaust nozzle of claim 1, wherein the beveled edge comprises an angle of between about 5-45 degrees relative to the reference plane.

3. The exhaust nozzle of claim 2, wherein the tubular final nozzle has a main body portion that tapers from an upstream portion to said downstream edge portion.

4. The exhaust nozzle of claim 1, wherein the beveled edge comprises an outermost edge portion, said outermost edge portion being oriented at approximately a bottom dead center position.

5. A method for forming an exhaust flow nozzle, comprising:
    forming a tubuiar flow nozzle having a continuous, linear tapering wall portion over its entire length, and a downstream edge portion through which exhaust flow from said jet engine exits said tubular flow nozzle; and
    forming said downstream edge portion with a linear beveled edge comprising an angle of greater than about 5 degrees relative to a reference plane extending orthogonal to a longitudinal axis of the tubular flow nozzle.

6. A method for reducing noise generated from a jet engine, comprising;
   mounting an exhaust flow nozzle having a continuous, linear tapering outer wall over its entire length adjacent a downstream end of a jet engine;
   using a downstream linear beveled edge of said exhaust flow nozzle to alter a flow path of exhaust flow exiting said exhaust flow nozzle such that an exhaust plume exiting said downstream edge is impeded from migrating below a bottom dead center position of said exhaust flow nozzle.

* * * * *